(12) United States Patent
Daud et al.

(10) Patent No.: US 7,870,345 B2
(45) Date of Patent: Jan. 11, 2011

(54) SYSTEMS AND METHODS FOR MANAGING STALLED STORAGE DEVICES

(75) Inventors: Asif Daud, Issaquah, WA (US); Tyler A. Akidau, Seattle, WA (US); Ilya Maykov, Seattle, WA (US); Aaron J. Passey, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 468 days.

(21) Appl. No.: 12/057,302

(22) Filed: Mar. 27, 2008

(65) Prior Publication Data

US 2009/0249013 A1    Oct. 1, 2009

(51) Int. Cl.
G06F 12/06 (2006.01)
(52) U.S. Cl. .......................... 711/147; 711/152
(58) Field of Classification Search .............. 711/100, 711/110, 147, 148, 152, 158; 707/100
See application file for complete search history.

(56) References Cited

U.S. PATENT DOCUMENTS

| | | | |
|---|---|---|---|
| 5,163,131 | A | 11/1992 | Row et al. |
| 5,181,162 | A | 1/1993 | Smith et al. |
| 5,230,047 | A | 7/1993 | Frey et al. |

(Continued)

FOREIGN PATENT DOCUMENTS

| EP | 0774723 | 5/1997 |
|---|---|---|
| WO | WO 94/29796 | 12/1994 |
| WO | WO 00/57315 | 9/2000 |

(Continued)

OTHER PUBLICATIONS

Dorai et al.: "Transparent Threads: Resource Sharing in SMT Processors for High Single-Thread Performance," oceedings of the 2002 International Conference on Parallel Architectures and Complication Techniques, 2002, 12 Pages.*

(Continued)

*Primary Examiner*—Pierre-Michel Bataille
(74) *Attorney, Agent, or Firm*—Knobbe, Martens, Olson & Bear, LLP

(57) ABSTRACT

Embodiments relate to systems and methods for managing stalled storage devices of a storage system. In one embodiment, a method for managing access to storage devices includes determining that a first storage device, which stores a first resource, is stalled and transitioning the first storage device to a stalled state. The method also includes receiving an access request for at least a portion of the first resource while the first storage device is in the stalled state and attempting to provide access to a representation of the portion of the first resource from at least a second storage device that is not in a stalled state. In another embodiment, a method of managing access requests by a thread for a resource stored on a storage device includes initializing a thread access level for an access request by a thread for the resource. The method also includes determining whether the storage device, which has a device access level, is accessible based at least in part on the thread access level and the device access level and selecting a thread operation based at least in part on the determination of whether the storage device is accessible. The thread operation may be selected from attempting the thread access request if the device is accessible and determining whether to restart the thread access request if the device is not accessible.

15 Claims, 6 Drawing Sheets

U.S. PATENT DOCUMENTS

| | | |
|---|---|---|
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,548,724 A | 8/1996 | Akizawa et al. |
| 5,596,709 A | 1/1997 | Bond et al. |
| 5,612,865 A | 3/1997 | Dasgupta |
| 5,657,439 A | 8/1997 | Jones et al. |
| 5,668,943 A | 9/1997 | Attanasio et al. |
| 5,694,593 A | 12/1997 | Baclawski |
| 5,696,895 A | 12/1997 | Hemphill et al. |
| 5,734,826 A | 3/1998 | Olnowich et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,933,834 A | 8/1999 | Aichelen |
| 5,943,690 A | 8/1999 | Dorricott et al. |
| 5,996,089 A | 11/1999 | Mann |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,055,543 A | 4/2000 | Christensen et al. |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,397,311 B1 | 5/2002 | Capps |
| 6,408,313 B1 | 6/2002 | Campbell et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,502,172 B2 | 12/2002 | Chang |
| 6,502,174 B1 | 12/2002 | Beardsley |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,598,174 B1 | 7/2003 | Parks et al. |
| 6,618,798 B1 | 9/2003 | Burton et al. |
| 6,662,184 B1 | 12/2003 | Friedberg |
| 6,671,686 B2 | 12/2003 | Pardon et al. |
| 6,671,704 B1 | 12/2003 | Gondi et al. |
| 6,732,125 B1 | 5/2004 | Autrey et al. |
| 6,848,029 B2 | 1/2005 | Coldewey |
| 6,907,011 B1 | 6/2005 | Miller et al. |
| 6,917,942 B1 | 7/2005 | Burns et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 7,007,044 B1 | 2/2006 | Rafert et al. |
| 7,007,097 B1 | 2/2006 | Huffman et al. |
| 7,069,320 B1 | 6/2006 | Chang et al. |
| 7,111,305 B2 | 9/2006 | Solter et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,184,421 B1 | 2/2007 | Liu et al. |
| 7,228,299 B1 | 6/2007 | Harmer et al. |
| 7,240,235 B2 | 7/2007 | Lewalski-Brechter |
| 7,257,257 B2 | 8/2007 | Anderson et al. |
| 7,318,134 B1 | 1/2008 | Oliveira et al. |
| 7,373,426 B2 | 5/2008 | Jinmei et al. |
| 7,451,341 B2 | 11/2008 | Okaki et al. |
| 7,509,448 B2 | 3/2009 | Fachan et al. |
| 7,558,910 B2 * | 7/2009 | Alverson et al. ............ 711/110 |
| 7,783,666 B1 * | 8/2010 | Zhuge et al. ................ 707/783 |
| 2001/0047451 A1 | 11/2001 | Noble et al. |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0014391 A1 | 1/2003 | Evans et al. |
| 2003/0033308 A1 | 2/2003 | Patel et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0131860 A1 | 7/2003 | Ashcraft et al. |
| 2003/0135514 A1 | 7/2003 | Patel et al. |
| 2003/0158873 A1 | 8/2003 | Sawdon et al. |
| 2003/0163726 A1 | 8/2003 | Kidd |

| | | | |
|---|---|---|---|
| 2003/0172149 | A1 | 9/2003 | Edsall et al. |
| 2003/0182325 | A1 | 9/2003 | Manley et al. |
| 2004/0003053 | A1 | 1/2004 | Williams |
| 2004/0024963 | A1 | 2/2004 | Talagala et al. |
| 2004/0133670 | A1 | 7/2004 | Kaminsky et al. |
| 2004/0153479 | A1 | 8/2004 | Mikesell et al. |
| 2004/0189682 | A1 | 9/2004 | Troyansky et al. |
| 2004/0199734 | A1 | 10/2004 | Rajamani et al. |
| 2004/0205141 | A1 | 10/2004 | Goland |
| 2004/0230748 | A1 | 11/2004 | Ohba |
| 2004/0260673 | A1 | 12/2004 | Hitz et al. |
| 2005/0066095 | A1 | 3/2005 | Mullick et al. |
| 2005/0114402 | A1 | 5/2005 | Guthrie |
| 2005/0114609 | A1 | 5/2005 | Shorb |
| 2005/0125456 | A1* | 6/2005 | Hara et al. .................. 707/200 |
| 2005/0171960 | A1 | 8/2005 | Lomet |
| 2005/0171962 | A1 | 8/2005 | Martin et al. |
| 2005/0188052 | A1 | 8/2005 | Ewanchuk et al. |
| 2005/0192993 | A1 | 9/2005 | Messinger |
| 2005/0289169 | A1 | 12/2005 | Adya et al. |
| 2005/0289188 | A1 | 12/2005 | Nettleton et al. |
| 2006/0004760 | A1 | 1/2006 | Clift et al. |
| 2006/0059467 | A1 | 3/2006 | Wong |
| 2006/0074922 | A1 | 4/2006 | Nishimura |
| 2006/0095438 | A1 | 5/2006 | Fachan et al. |
| 2006/0101062 | A1 | 5/2006 | Godman et al. |
| 2006/0129584 | A1 | 6/2006 | Hoang et al. |
| 2006/0129631 | A1 | 6/2006 | Na et al. |
| 2006/0129983 | A1 | 6/2006 | Feng |
| 2006/0230411 | A1 | 10/2006 | Richter et al. |
| 2006/0277432 | A1 | 12/2006 | Patel |
| 2007/0091790 | A1 | 4/2007 | Passey et al. |
| 2007/0094269 | A1 | 4/2007 | Mikesell et al. |
| 2007/0094277 | A1 | 4/2007 | Fachan et al. |
| 2007/0094310 | A1 | 4/2007 | Passey et al. |
| 2007/0094431 | A1 | 4/2007 | Fachan |
| 2007/0094452 | A1 | 4/2007 | Fachan |
| 2007/0168351 | A1 | 7/2007 | Fachan |
| 2007/0171919 | A1 | 7/2007 | Godman et al. |
| 2007/0195810 | A1 | 8/2007 | Fachan |
| 2007/0233684 | A1 | 10/2007 | Verma et al. |
| 2007/0233710 | A1 | 10/2007 | Passey et al. |
| 2008/0005145 | A1 | 1/2008 | Worrall |
| 2008/0010507 | A1 | 1/2008 | Vingralek |
| 2008/0021907 | A1 | 1/2008 | Patel et al. |
| 2008/0031238 | A1 | 2/2008 | Harmelin et al. |
| 2008/0034004 | A1 | 2/2008 | Cisler et al. |
| 2008/0044016 | A1 | 2/2008 | Henzinger |
| 2008/0046432 | A1 | 2/2008 | Anderson et al. |
| 2008/0046443 | A1 | 2/2008 | Fachan et al. |
| 2008/0046444 | A1 | 2/2008 | Fachan et al. |
| 2008/0046445 | A1 | 2/2008 | Passey et al. |
| 2008/0046475 | A1 | 2/2008 | Anderson et al. |
| 2008/0046476 | A1 | 2/2008 | Anderson et al. |
| 2008/0046667 | A1 | 2/2008 | Fachan et al. |
| 2008/0059541 | A1 | 3/2008 | Fachan et al. |
| 2008/0126365 | A1 | 5/2008 | Fachan et al. |
| 2008/0154978 | A1 | 6/2008 | Lemar et al. |
| 2008/0168458 | A1 | 7/2008 | Fachan et al. |

FOREIGN PATENT DOCUMENTS

| | | |
|---|---|---|
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Nov. 15, 2002 Int'l Search report PCT/US02/24728, 2 pages.
Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.Jan. 2201, 8 pages.
Feb. 22, 2008 Int'l Search report PCT/US07/018326, 20 pages.
May 8, 2008 Int'l Search report PCT/US07/018324, 13 pages.
Philip A. Bernstein, Vassos Hadzilacos, and Nathan Goodman, Concurrency Control and Recovery in Database Systems, Addison-Wesley, 370 pages, 1987.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Nancy A. Lynch, Distributed Algorithms, Morgan Kaufmann, 1996, pp. 1-409.
Nancy A. Lynch, Distributed Algorithms, Morgan Kaufmann, 1996 pp. 410-871.
Sape Mullender, editor, Distributed Systems (2nd Ed.), ACM Press/Addison-Wesley Publishing Co., New York, NY, USA, 1993, pp. 1-327.
Sape Mullender, editor, Distributed Systems (2nd Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. 1-450.
Gerhard Weikum, et al., Transactional Information Systems: Theory, Algorithms, and the Practice of Concurrency Control and Recovery, Morgan Kaufmann, 2002, pp. 451-863.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Long, Darrell D.E., et al., *Swift/RAID: A Distributed Raid System*, Computing Systems, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat no. 90CH2840-7), pp. 430-437, Feb. 5, 1990.
United States Court of Appeals, Federal Circuit, *Seachange International, Inc.* Vs. *nCUBE, Corp.*, Oct. 26, 2004, 28 pages.

United States Court of Appeals, Federal Circuit, *Seachange International, Inc.* Vs. *C-Corp, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
ByteandSwitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., Minix Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of Raid Filesystem VAFS/HR," The Special Interest Group Notes of IPSJ, Japan, Information Processing Society of Japan, Sep. 16, 1994, vol. 94, No. 80, p. 9-16.

* cited by examiner

SYSTEMS AND METHODS FOR MANAGING STALLED STORAGE DEVICES

CROSS-REFERENCE TO RELATED APPLICATIONS

This application was filed on the same day as the following U.S. Patent applications: U.S. patent application Ser. No. 12/057,298, entitled "SYSTEMS AND METHODS FOR MANAGING STALLED STORAGE DEVICES," U.S. patent application Ser. No. 12/057,321, entitled "SYSTEMS AND METHODS FOR A READ ONLY MODE FOR A PORTION OF A STORAGE SYSTEM," and U.S. patent application Ser. No. 12/057,303, entitled "SYSTEMS AND METHODS FOR A READ ONLY MODE FOR A PORTION OF A STORAGE SYSTEM," all of which are hereby incorporated by reference herein in their entirety.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

1. Field

Embodiments disclosed herein relate generally to systems and methods for managing stalled storage devices in a storage system.

2. Description of the Related Art

The amount of data stored on digital computing systems has increased dramatically in recent years. Accordingly, users have become increasingly reliant on a storage system associated with these computing systems to safely store this data. The storage system may include one or more storage devices such as, for example, one or more hard disk drives. On occasion, a storage device may experience a problem that, for example, causes the storage device to respond relatively slowly to access requests for data stored on the device. While the storage device is experiencing the problem, the storage device may appear (for example, to other storage devices and to processes on the computing system) to have stalled. In some cases, for example, the problem may cause the storage device to fail. In other cases, for example, the storage device may be able to recover from the problem and return to normal operation. In some computing system implementations, a stalled storage device may adversely affect the performance of computing system.

SUMMARY OF THE DISCLOSURE

Because of the foregoing challenges and limitations, there is a need to provide systems and methods for managing stalled storage devices. In various embodiments, the disclosed systems and methods are generally applicable to a storage system comprising one or more storage devices and in certain embodiments, to a clustered storage system comprising a plurality of storage nodes.

An embodiment of a method for managing access to storage devices is described. The method comprises determining that a first storage device is stalled, and transitioning the first storage device to a stalled state. A first resource is stored on the first storage device. The method further comprises receiving an access request for at least a portion of the first resource while the first storage device is in the stalled state, and attempting to provide access to a representation of the portion of the first resource from at least a second storage device that is not in a stalled state.

In another embodiment, a computer-readable medium is described. Executable instructions are stored on the computer-readable medium that, when executed by a processor, cause the processor to perform a method for managing access to storage devices. The method for managing access to storage devices comprises determining that a first storage device is stalled, and transitioning the first storage device to a stalled state. A first resource is stored on the first storage device. The method further comprises receiving an access request for at least a portion of the first resource while the first storage device is in the stalled state, and attempting to provide access to a representation of the portion of the first resource from at least a second storage device that is not in a stalled state.

In another embodiment, a system for managing storage on storage devices is described. The system comprises a first storage device that is configured to store a first resource and a second storage device that is configured to store a representation of at least a portion of the first resource. The system also comprises a software module that is configured to determine that the first storage device is stalled, transition the first storage device to a stalled state, receive an access request for the at least a portion of the first resource while the first storage device is in the stalled state, and attempt to provide access to the representation of the portion of the first resource from at least the second storage device.

In another embodiment, a method of managing access requests by a thread for a resource stored on a storage device is described. The method comprises initializing a thread access level for an access request by a thread for a resource stored on a storage device. The storage device has a device access level. The method further comprises determining whether the storage device is accessible based at least in part on the thread access level and the device access level and selecting a thread operation based at least in part on the determination of whether the storage device is accessible. The thread operation may be selected from attempting the thread access request if the device is accessible and determining whether to restart the thread access request if the device is not accessible.

In another embodiment, a computer-readable medium is described. Executable instructions are stored on the computer-readable medium that, when executed by a processor, cause the processor to perform a method of managing access requests by a thread for a resource stored on a storage device. The method of managing access requests comprises initializing a thread access level for an access request by a thread for a resource stored on a storage device. The storage device has a device access level. The method further comprises determining whether the storage device is accessible based at least in part on the thread access level and the device access level and selecting a thread operation based at least in part on the determination of whether the storage device is accessible. The thread operation may be selected from attempting the thread access request if the device is accessible and determining whether to restart the thread access request if the device is not accessible.

In another embodiment, a system of managing access requests by a thread for a resource stored on a storage device is described. The system comprises a storage device for storing a resource and a software module. The software module is configured to initialize a thread access level for an access request by a thread for a resource stored on a storage device. The storage device has a device access level. The software module is further configured to determine whether the storage device is accessible based at least in part on the thread access level and the device access level and to select a thread operation based at least in part on whether the storage device is determined to be accessible. The thread operation may be selected from attempting the thread access request if the device is accessible and determining whether to restart the thread access request if the device is not accessible.

For purposes of this summary, certain aspects, advantages, and novel features are described herein. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

Figure 1:
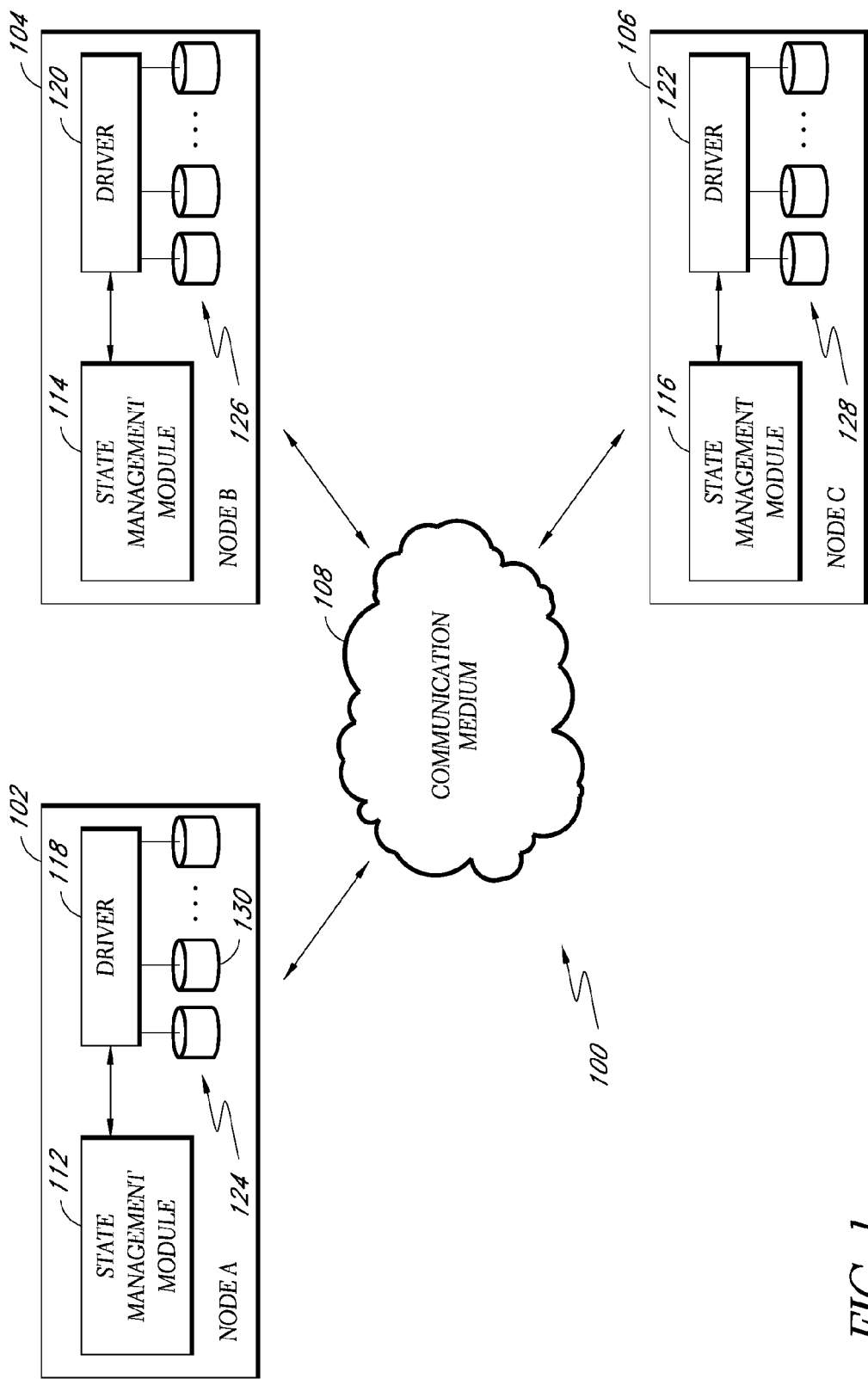
FIG. 1 schematically illustrates a high-level diagram of an embodiment of a storage system comprising a plurality of nodes configured to communicate through a communication medium.

These and other features will now be described with reference to the drawings summarized above. The drawings and the associated descriptions are provided to illustrate embodiments and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in the context of a file system, which may be a distributed file system. The present invention is not limited by the type of environment in which the systems and methods are used, however, and systems and methods may be used in other environments, such as, for example, other file systems, other distributed systems, the Internet, the World Wide Web, a private network for a hospital, a broadcast network for a government agency, and an internal network for a corporate enterprise, an Intranet, a local area network, a wide area network, a wired network, a wireless network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims and their equivalents.

One example of a distributed file system, in which embodiments of systems and methods described herein may be implemented, is described in U.S. patent application Ser. No. 10/007,003 entitled "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001, U.S. Pat. No. 7,146,524 entitled "SYSTEMS AND METHODS FOR PROVIDING A DISTRIBUTED FILE SYSTEM INCORPORATING A VIRTUAL HOT SPARE," filed Oct. 25, 2002, and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

For purposes of illustration, some embodiments will also be described with reference to updating data structures in a file system using information stored in related data structures of the file system. Embodiments of a file system capable of updating data structures with information stored in related data structures of a file system are disclosed in U.S. patent application Ser. No. 11/255,337, titled, "SYSTEMS AND METHODS FOR ACCESSING AND UPDATING DISTRIBUTED DATA," and is hereby incorporated by reference in its entirety.

I. Example Storage System Overview

For purposes of illustration, embodiments of the disclosed system and methods will be described in the context of access to resources stored on a storage system. Embodiments of the systems and methods may be utilized for access to the broadest range of resources such as, for example, data, metadata, graphics files, sound or video files, images, databases, spreadsheets, software, programs, and/or processes. Resources may be utilized in environments such as, for example, computer systems, network systems, storage systems, file systems, telecommunications systems, library systems, inventory systems, reservation systems, retail systems, on-line systems, financial systems, and the like.

In various embodiments, the resources are stored on a storage system that comprises one or more storage devices. Embodiments of the storage system may utilize any suitable type storage devices including, for example, semiconductor storage, magnetic storage, and/or optical storage. For example, resources may be stored on one or more of the following: a hard disk drive, partitions of a hard disk drive, multiple hard disks, local and/or remote disks, redundant, mirrored, and/or striped disks, SCSI devices, RAID disk systems, clustered storage systems, and so forth. Additionally, storage devices may include magnetic tapes, floppy disks, cartridges, and optical disks such as CD-ROMs or DVDs. Furthermore, resources may be stored on storage devices such as volatile or nonvolatile memory, comprising, for example, dynamic random access memory (DRAM), static random access memory (SRAM), non-volatile random access memory (NVRAM), or read only memory (ROM).

In some of the example embodiments described herein, the resources will be discussed in terms of data stored on the storage system. In many cases, the data will be organized in a file system (such as, for example, a distributed file system). In certain embodiments, in addition to storing data files on the storage devices, the storage system may also store protection data associated with the data files. For example, in some embodiments the protection data may comprise parity data and/or error correction data, which can be used to reconstruct portions of data that have been corrupted and/or cannot be accessed. In other embodiments, the protection data may comprise mirrored copies of the data. In still other embodiments, data striping across multiple storage devices may be used. Other data protection methods may be utilized, and in some embodiments, more than one data protection method can be used to provide a high degree of reliability and recoverability for the data.

FIG. 1 schematically illustrates a high-level system diagram of an embodiment of a storage system 100. In this example embodiment, the storage system 100 comprises a plurality of storage nodes 102 (node A), 104 (node B), and 106 (node C) configured to communicate through a communication medium 108. Although three storage nodes 102, 104, and 106 are depicted in the example illustrated in FIG. 1, in other embodiments a different number of nodes may be used such as, for example, 1, 2, 4, 5, 6, 11, 20, 43, 100, or more, and the nodes may be in communication with other systems. Each storage node 102, 104, and 106 is configured to store resources on storage devices 124, 126, and 128, respectively. In this example, the storage devices 124, 126, 128 comprise one or more hard disk drives (such as, for example, hard disk drive 130). As stated above, in other embodiments, the storage devices 124, 126, 128 may comprise any suitable storage medium. Data is stored on the storage devices 124, 126, and 128, and in certain embodiments, as described above, protection data associated with the data is also stored by the system 100. To increase the ability of the system 100 to recover data in the case of a failed storage device (or node), some or all of the protection data associated with the data stored on a particular storage device on a particular node, advantageously may be stored on a different node and/or on a different storage device.

In one embodiment, the communication medium 108 comprises a Transmission Control Protocol (TCP) connection. In other embodiments, the communication medium 108 includes the World Wide Web (WWW), a Socket Direct Protocol (SDP) connection over Infiniband, gigabit Ethernet, a local area network, a wide area network, a wireless network, a wired network, a serial connection, Internet Protocol (IP) over FibreChannel, proprietary communication links, connection based datagrams or streams, and/or connection based protocols. In some embodiments, a storage node is a local area network that communicates with other storage nodes through a wide area network.

In certain embodiments, the storage system 100 comprises a clustered storage system, the storage nodes 102, 104, and 106 comprise nodes of the clustered storage system, and the communication medium 108 comprises a high-performance, low-latency network such as, for example, gigabit Ethernet or Infiniband. The clustered storage system may comprise 1, 2, 3, 6, 10, 24, 48, 100, or more nodes. In certain embodiments, the clustered storage system may comprise a distributed file system and may use operating system software such as, for example, OneFS® operating system software available from Isilon Systems, Inc. (Seattle, Wash.).

In the example storage system 100 illustrated in FIG. 1, each node 102, 104, 106 comprises, respectively, a state management module (112, 114, 166) and a driver (118, 120, 116) configured to communicate device specific commands to the storage devices (124, 126, 128). In certain embodiments, each state management module 112, 114, 116 communicates bi-directionally with the driver 118, 120, 122 via a bus or suitable communication subsystem.

The state management modules 112, 114, 116 may comprise one or more processors and may include memory (for example, NVRAM, flash memory, cache memory, and/or a hard disk drive). In certain embodiments, each state management module 112, 114, 116 is configured to execute processes for (i) managing requests for the resources associated with its respective node 102, 104, 106 and/or for (ii) managing requests for resources associated with remote nodes. In some embodiments, the state management modules 112, 114, 116 may be used to maintain information relating to the nodes and/or the storage devices currently available to the system 100. For example, one or more of the state management modules 112, 114, 116 may communicate to other nodes (via the communication medium 108) information relating to which storage nodes and/or storage drives are currently present in the system 100, their current operational state (for example, available or unavailable), and/or how much space is available on each node and/or storage device. As an illustrative example, the state management module 112 of node A 102 may be configured to send a notification to the state management module 114 of the node B 104 and the state management module 116 of the node C 106 when a storage device associated with node A 102 (for example, the hard disk drive 130) becomes unavailable, when the storage device becomes available again, and/or when the storage device becomes permanently unavailable. As will be described, other notifications may be used in certain embodiments of the system 100. Accordingly, the system 100 advantageously may direct access requests for data to the storage nodes and/or storage devices that are currently available and that store the data (and/or the protection data associated with the data).

In certain embodiments, one or more nodes (called an "accelerator" node) may include a state management module but not a driver and its associated storage device. In certain such embodiments, accelerator node(s) may be used to improve the performance of the system 100 by executing some or all of the processes for managing requests for resources that are stored on the nodes having storage devices. For example, in some embodiments, an accelerator node (rather than a storage node) may be used for system operations such as quota management, load balancing, snapshots, backup and restore operations, and so forth.

In certain embodiments, the state management modules 112, 114, 116 may be configured to use one or more protocols for coordinating activities among multiple nodes and/or systems. For example, embodiments of a protocol for coordinating activities among nodes are disclosed in U.S. patent application Ser. No. 11/262,306, entitled "NON-BLOCKING COMMIT PROTOCOL SYSTEMS AND METHODS," filed Oct. 28, 2005, which claims priority to U.S. Provisional Appl. No. 60/623,843, entitled "NON-BLOCKING COMMIT PROTOCOL SYSTEMS AND METHODS," filed Oct. 29, 2004, and U.S. patent application Ser. No. 11/449,153, entitled "NON-BLOCKING COMMIT PROTOCOL SYSTEMS AND METHODS," filed Jun. 8, 2006, all of which are hereby incorporated herein by reference in their entirety.

In the example storage system 100 schematically illustrated in FIG. 1, the state management modules 112, 114, and 116 may be configured to execute one or more program modules that carry out embodiments of the methods described herein. The word module refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units. The modules may be stored in any type of computer-readable medium or other computer storage device. All of the methods and processes described herein may be embodied in, and partially and/or fully automated via, software code modules executed by one or more general purpose computers or processors. The software code modules may be stored in any type of computer-readable medium or other computer storage device. Some or all of the methods and processes may alternatively be embodied in specialized computer hardware.

In certain embodiments, one or more of the state management modules 112, 114, and 116 may comprise a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth. In other embodiments, one or more of the state management modules 112, 114, and 116 may comprises a special purpose computer comprising one or more integrated circuits such as application-specific integrated circuits (ASICs), field-programmable gate arrays (FPGAs), and so forth.

The storage system 100 may be configured to operate with a variety of one or more operating systems that perform standard operating system functions such as accessing, opening, reading, writing, and closing a file. It is recognized that other operating systems may be used, such as, for example, Microsoft® Windows® 3.X, Microsoft® Windows® 98, Microsoft® Windows® 2000, Microsoft® Windows® NT, Microsoft® Windows® Vista®, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

II. Example Systems and Methods for Managing Access to a Stalled Storage Device

During normal operations, the example storage system 100 shown in FIG. 1 will handle numerous access requests for resources stored on the system 100. Access requests can include, for example, read requests and write requests for the data (and/or protection data) stored on the system 100. Storage devices may be able to respond to an access request on a relatively short time (such as a few milliseconds for fast hard disk drives). However, on occasion, a storage device may experience a problem that causes the response to the access request to take longer than normal. The problem may be temporary, and the device may soon return to normal operation, or the problem may be permanent, and the device may need to be removed from the storage system.

A storage device may respond slowly for a variety of reasons. For example, as described above, embodiments of the storage system 100 may include one or more hard disk drives. An attempt to access (for example, read or write) data on a hard disk drive may fail due to, for example, a mechanical imperfection on a disk platter (for example, an oil spot, a speck of dust, a pit caused by a crash of the read/write head, and so forth), physical shock and/or vibrations, electrical and/or magnetic interference, and so forth. Many commercially available hard disk drives have a controller that automatically employs a sequence of techniques to recover from data access errors (for example, seek errors and/or read errors). For example, if a read error is detected, the disk controller may first attempt to reconstruct the data using an error correction code (ECC) stored on the disk. If the controller is unable to reconstruct the data using the ECC, the controller may wait for the disk platter to spin around and then the controller may retry the read. The controller may attempt several such retries, and if the retries fail, the controller, in some embodiments, may then invoke more advanced error correction algorithms that are more complex and take additional processing time. Finally, if the advanced error correction algorithms fail, the controller may return an error message (for example, an ECC error) to the calling process. For many hard drives, this automatic sequence of error correction techniques may take a considerable period of time (for example, from seconds to tens of seconds), during which the response of the hard disk to access requests from the other devices, nodes, and/or processes in the system 100 will appear to be "slow."

The ability of a hard disk drive controller to provide automatic error correction is generally considered to be beneficial in computing environments where a single hard disk drive stores data without data protection schemes such as parity data, striping, or mirroring (for example, a personal computer). However, storage system embodiments that implement data protection methods may be able to recover (and/or reconstruct) data stored on a slow device by accessing protection data (for example, using parity data and/or a mirrored copy) on other storage devices in the system. Such storage system embodiments may be able to recover (and/or reconstruct) the data more rapidly than waiting for the slow device to perform its automatic error correction protocol. Accordingly, it may be advantageous for embodiments of the storage system 100 to detect slow devices and redirect I/O requests for data on the slow device to other storage nodes and/or storage devices.

Moreover, in some storage system embodiments, a slowdown caused by one slow storage device (and/or node) may cascade to other storage devices and/or nodes, thereby degrading the performance of the storage system as a whole. For example, a system-wide resource (such as a vnode lock)

may be held on a data file, portions of which are stored on the slow drive. Processes on other nodes attempting to access the locked data file will have to wait until the slow drive releases the lock before the other processes can access the data file. These other processes are effectively deadlocked by the slow drive. Additionally, processes on other nodes will be slowed as they attempt to access data stored on the slow drive. Therefore, in some embodiments, a single slow drive disadvantageously may cause a global slowdown affecting all the storage devices in the storage system.

Storage devices at times may exhibit other types of non-normal behavior, additionally or alternatively to responding slowly to access requests for resources. The term "stalled" is used herein to describe storage devices exhibiting a broad range of non-normal behaviors including, but not limited to, responding slowly (and/or erratically) to access requests, returning hardware, firmware, and/or software errors (such as, for example, ECC errors), and so forth.

Therefore, it may be advantageous for embodiments of a storage system to implement systems and methods for managing stalled storage devices. Such embodiments may provide more reliable and rapid access to resources stored on the system as well as avoiding, or at least reducing the likelihood, of a global slowdown caused by one or more stalled storage devices.

Figure 2:
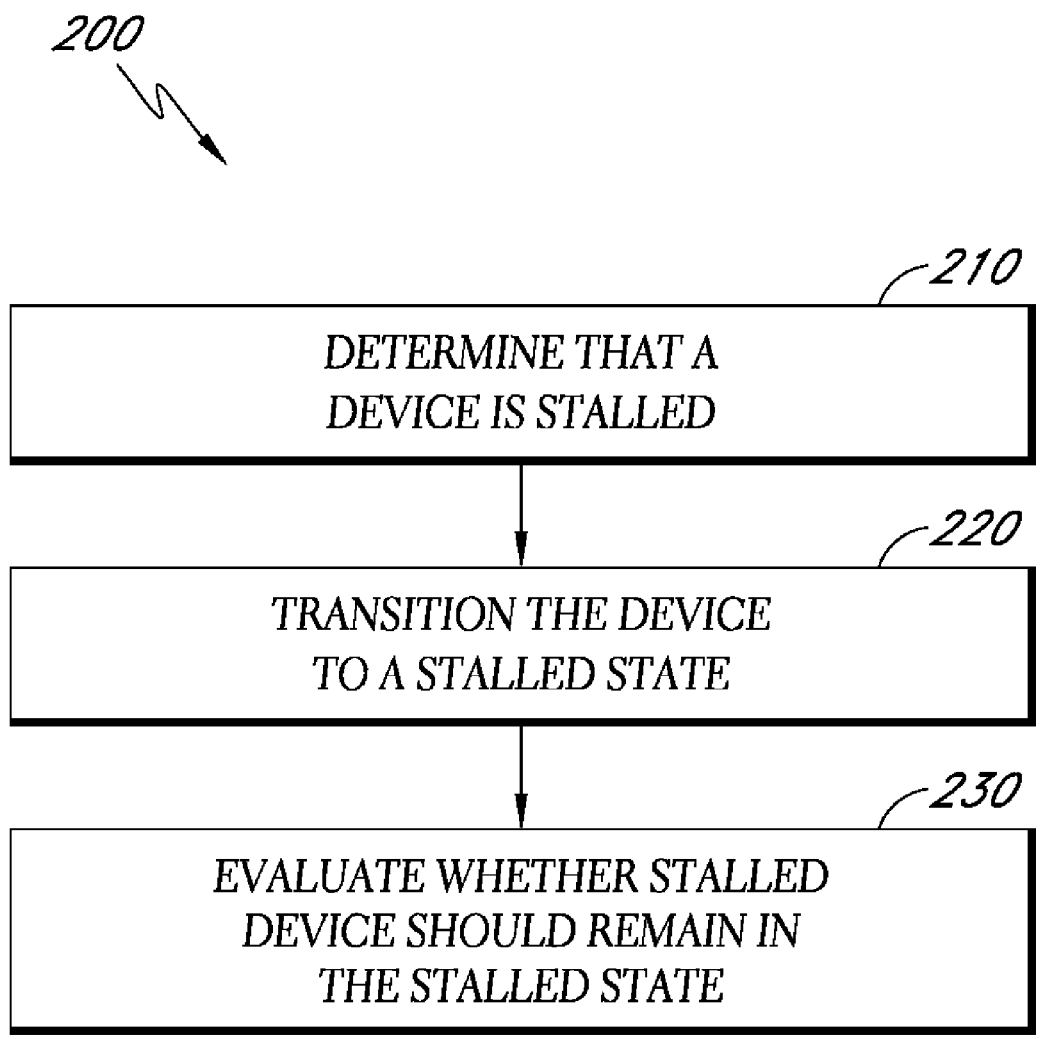
FIG. 2 is a flow chart that schematically illustrates an embodiment of a method for managing access to stalled storage devices.

FIG. 2 is a flow chart that schematically illustrates an embodiment of a method 200 for managing access to stalled storage devices. Embodiments of the storage system 100 shown in FIG. 1 may be configured to store and/or implement embodiments of the method 200. An example of one embodiment of the method 200 will be described in the illustrative context of data access to the to the storage system 100. In this example, access requests are made for data stored on the storage device 124 of node A 102. The access request for the data may be initiated by the node A 102 (on which the data is stored) or by other nodes (for example, node B 104 and/or node C 106). For the purposes of this illustrative example, it will be assumed that some or all of the requested data is stored on the hard disk drive 130, which responds slowly to the access request.

In this example of the method 200, in state 210, the system 100 determines whether a storage device is stalled. For example, in some embodiments, the system 100 performs one or more diagnostic tests (further described below) to determine whether the device is responding slowly compared to an expectation for normal response. If the device fails at least one of the one or more diagnostic tests, the method 200 proceeds to state 220 in which the system 100 transitions the device to a stalled state. For example, in some embodiments, the system 100 performs a "group change" in which a message is communicated to other nodes (for example, node B 104 and node C 106) that the hard disk drive 130 is going to enter the stalled state. The system 100 additionally may redirect pending requests for data stored on the hard disk drive 130 to other storage devices (that may store a mirrored copy of the requested data and/or parity data permitting reconstruction of the requested data). Once the group change is complete, nodes on the system 100 know that the drive 130 is stalled, and future access requests for data stored on the drive 130 are routed to other nodes and/or devices.

In this example, the method 200 continues in state 230 in which the system 100 evaluates whether the stalled device should remain in the stalled state or be transitioned to another state (an example state model will be described below with reference to FIG. 4). For example, in certain embodiments, the system 100 runs one or more evaluation tests to determine the nature and/or extent of the problem on the stalled drive. The evaluation tests may include testing and/or repair of the sectors of the drive 130 that caused the slow response. In some embodiments, if the system 100 determines that the device is once again functioning normally, the system 100 may transition the device from the stalled state back to a normal operational state. However, if the system 100 determines that the device is not functioning normally, the system 100 may transition the device from the stalled state to a failed state.

Further examples of embodiments of the method 200 for managing access to storage devices will now be described in the illustrative context of access to resources stored on the storage system 100. In these illustrative examples, the access requests are input/output (I/O) requests for data stored on a storage device (for example, the hard disk drive 130 on node A 102).

A. Examples of Determining that a Device is Stalled

As described above, stalled devices include storage devices that respond slowly to access requests for data stored on the device. In some embodiments of the method 200, in state 210, the system 100 determines whether a device has stalled by measuring an I/O response time for the device and comparing the measured I/O response time to an expected I/O response time for the device.

1. Time Measurement

Figure 3:
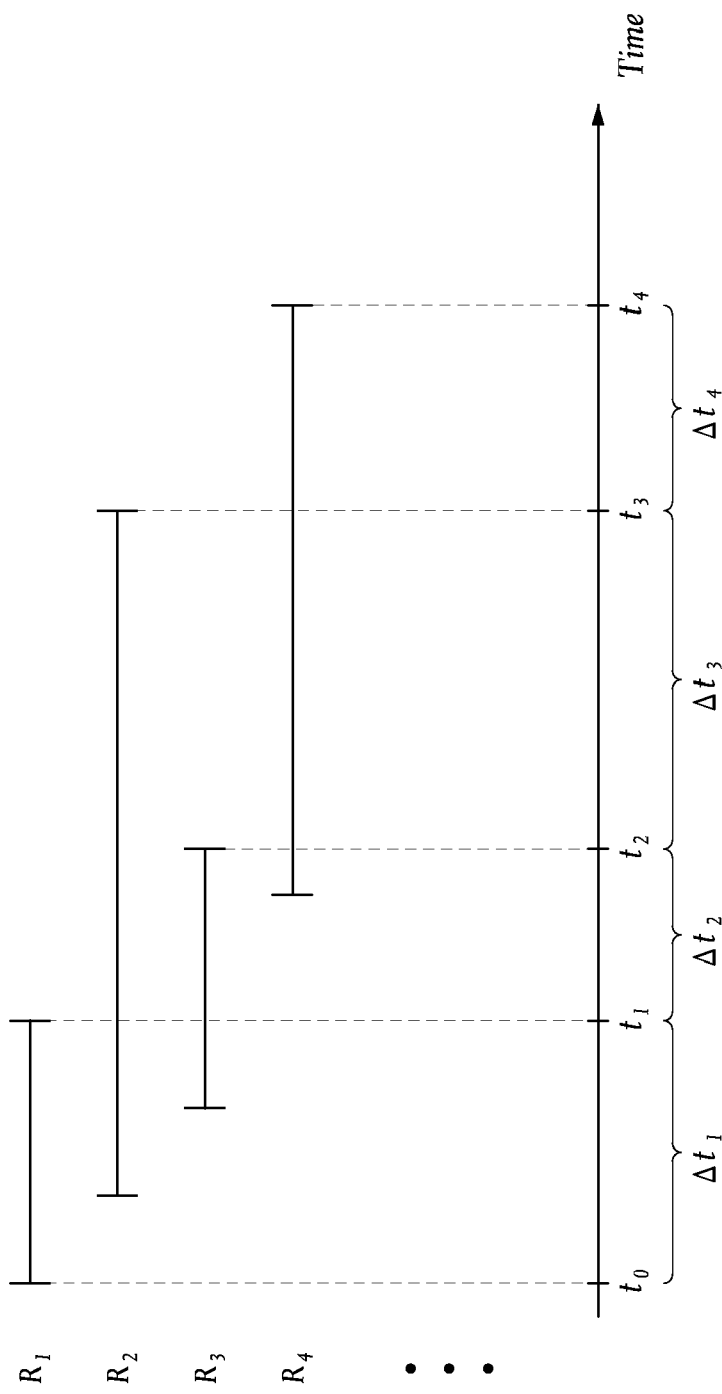
FIG. 3 schematically illustrates an example of time measurements for four example access requests, $R_1$, $R_2$, $R_3$, and $R_4$, for resources stored on a storage device.

FIG. 3 schematically illustrates an example of how I/O response times are measured in an embodiment of the storage system 100. In FIG. 3, four example I/O requests to a storage device, $R_1$, $R_2$, $R_3$, and $R_4$, are shown versus time. For each I/O request, the leftmost vertical bar indicates the time the request was initiated, and the rightmost vertical bar indicates the time the request was completed. In this embodiment, the I/O response time is determined as the time between successive I/O completions rather than the time between request initiation and request completion. In the example shown in FIG. 3, the first request $R_1$ is initiated at time $t_0$, and since there are no other outstanding requests, time measurement begins at $t_0$. In this example, $R_1$ completes at time $t_1$ before either of the other then active requests ($R_2$ and $R_3$), and the first I/O response time is $\Delta t_1 = t_1 - t_0$. A second I/O response time period starts at time $t_1$ and ends at the next completion, which is the time $t_2$ when the request $R_3$ completes. The second I/O response time is $\Delta t_2 = t_2 - t_1$. A third I/O response time period starts at time $t_2$, because the requests $R_2$ and $R_3$ are active, and ends at time $t_3$ when the request $R_2$ completes. The third I/O response time is $\Delta t_3 = t_3 - t_2$. A fourth I/O response time period starts at time $t_3$, because the request $R_4$ is still active, and ends at time $t_4$ when the request $R_4$ completes. The fourth I/O response time is $\Delta t_4 = t_4 - t_3$. When the request $R_4$ completes, there are no active requests, and I/O response time measurements stop.

The time, t, may be measured in a variety of ways in various embodiments. For example, the time, t, may be measured relative to a kernel's system time, a real-time clock, a timestamp counter (TSC), a scheduling clock, using sets of time, and so forth. For a given clock, the time may be measured to within a time resolution. For example, in some embodiments of a scheduling clock, the time resolution is about 10 ms. The time resolution of the clock may introduce round-off errors into the measurement of a time period. For example, if a request initiates just after a clock "tick" and completes just before the next clock "tick," the measured I/O response time will be zero since the request was performed entirely within one clock "tick." In contrast, a very short request that straddles a clock "tick" (for example, initiates just before the clock "tick" and completes just after the clock "tick") will have a measured I/O response time approximately equal to the time resolution of the clock. Accordingly, it may be advantageous for embodiments of the disclosed systems and methods to take account of the time resolution of the measurements as a potential lower limit for the accuracy and precision of the I/O response times.

In certain embodiments of the systems and methods for managing stalled storage devices, I/O response time measurements (for example, $\Delta t_1$, $\Delta t_2$, $\Delta t_3$, and $\Delta t_4$) are used, at least in part, in determining whether a particular storage device has stalled. There are a variety of factors that may influence measured I/O response times in various embodiments of the storage system 100. In some embodiments, time measurements may be affected by kernel load. For example, in some implementations, I/O response time measurements are clocked in interrupt threads, whose execution can be delayed by kernel activities. In some embodiments of the system 100, the kernel load may cause time measurement delays of up to about 500 ms. Therefore, I/O response times of about 500 ms may, in some cases, indicate a high kernel load rather than a slow drive.

Other factors influencing time measurements depend on the type of storage device used by the system. In embodiments of storage systems 100 using hard disk drives, the time taken for an I/O operation to complete includes seek time (the time needed to move a read/write head into position on the disk) and media transfer time (the time needed to transfer the data to the disk). Seek times can vary widely and may account for most of the completion time for the I/O operation. However, not every I/O request causes a significant seek. For example, to improve performance, a storage system may attempt to allocate blocks of a data file near each other on the disk to reduce seek time during a sequential I/O operation. Also, file fragmentation may result in numerous small I/O requests to regions of the disk located near each other, so that seek time for a fragmented file may not, in some cases, be excessive. Although, the media transfer time generally is much shorter than the seek time, longer media transfers may comprise a larger number of disk sectors, which may increase the likelihood of encountering a corrupted sector (thereby causing a delay due to the disk's error correction protocol).

Disk caching may also have an influence on time measurements. For example, in some embodiments, writes are acknowledged to the system when the data is stored on the disk's cache, rather than when the data is actually written to the storage medium. Therefore, the measurement of the I/O response time for a particular write operation may occur at a significantly later time than when the write was acknowledged. Read operations may be cached, but in embodiments in which the cache size is sufficiently large and logical block addressing (LBA) is used, read caching may not impact time measurements significantly.

As discussed above, certain embodiments of the disclosed systems and methods have the capability to evaluate whether a stalled device should remain in the stalled state or be transitioned to some other state. In certain such embodiments, common timing protocols are used both for determining whether a device is stalled and for determining whether a device is no longer stalled. One possible advantage of these embodiments is that it is less likely that a storage device will be transitioned back and forth between a stalled state and a non-stalled state simply due to differences in the timing protocols for entering and exiting the stalled state.

2. Example Diagnostic Tests for Detecting Stalled Devices

Embodiments of the disclosed systems and methods may use a variety of techniques for determining whether a storage device (and/or a node) has stalled. For example, in the case of slow devices, certain embodiments utilize one or more diagnostic tests or heuristics to determine whether the storage device response time is sufficiently slow to trigger the transition to the stalled state. Certain such embodiments advantageously may take into account time measurement factors described above such as, for example, clock time resolution, kernel load, disk seek time, disk caching, and so forth. Example diagnostic tests will now be described in the illustrative context of data I/Os to a hard disk drive. In certain embodiments, the storage system 100 may utilize some or all of the following diagnostic tests. If a storage device fails one (or more) diagnostic tests, the storage system 100 identifies the device as stalled.

a. Example Diagnostic Test 1: Single Slow I/O

In this example diagnostic test, a storage device that does not complete any I/O operations within a first threshold time $T_1$;, is considered to be stalled. For example, with reference to the example shown in FIG. 3, if any of the measured I/O response times $\Delta t_1$, $\Delta t_2$, $\Delta t_3$, or $\Delta t_4$ are greater than or equal to $T_1$ then the drive fails diagnostic test 1 and is considered to be stalled. In some embodiments, a running timer is started whenever an I/O response measurement starts so that the drive can be determined to be stalled (if the running time $\geq T_1$) without waiting for the slow I/O to complete (which may never occur). In some embodiments, a single I/O failure or error (such as an ECC error) will cause the device to fail diagnostic test 1.

A storage device that is lightly loaded receives relatively infrequent I/O requests. If an I/O request is slow and fails diagnostic test 1, as further described below, the device may be transitioned to the stalled state and evaluation procedures may be performed. If the evaluation procedures cause the device to transition out of the stalled state before the next I/O request is received, then this embodiment of managing access to stalled devices may do relatively little for system performance. However, the evaluation procedures may identify (and cause the repair of) disk sectors likely to lead to future ECC errors, which may reduce the likelihood of slow access on future I/Os.

The choice of the first time threshold $T_1$ may depend on one or more factors, which include system dependent and/or independent factors. For example, the first time threshold $T_1$ may be chosen to be longer than timing uncertainties due to clock time resolution (about 10 ms in some embodiments), kernel load (about 500 ms in some embodiments), and cache flushes on write operations. A possible advantage of such embodiments is a reduced likelihood that timing uncertainties will cause a healthy device to fail the diagnostic test 1 (a "false positive"). In some embodiments, the first threshold $T_1$ is short enough to catch disk drive error corrections such as retries. For example, in certain disk drive embodiments, the retry/error-correction sequence takes about 1 second. Therefore, in certain embodiments, the first time threshold $T_1$ is set to be about 900 ms so that the drive is identified as stalled before the retry/error-correction sequence returns a read error to the calling process. A threshold time $T_1$ of about 900 ms is longer than the 10 ms time resolution and the 500 ms kernel load uncertainty (applicable to some system embodiments) and will reduce the likelihood of false positives in these systems. In other embodiments, a different threshold time $T_1$ may be used, for example, 100 ms, 250 ms, 325 ms, 400 ms, 500 ms, 750 ms, 1120 ms, 5000 ms, and so forth. In certain embodiments, the time threshold $T_1$ may depend on time of day. For example, the time threshold $T_1$ may be longer during daytime than nighttime (or vice-versa).

In other embodiments, the time threshold $T_1$ may depend on one or a combination of other factors including a retry time for access requests to the device, a seek time for the storage device, an input/output rate of the storage device, a kernel delay, a system load, a load of the storage device, a cache flush time, and so forth. In some embodiments, the storage system 100 may monitor certain system parameters (for example, kernel load, device load, and so forth) and dynamically adjust the threshold $T_1$ based on current values of the system parameters.

b. Example Diagnostic Test 2: Multiple Slow I/Os

In this example diagnostic test, a storage device that experiences multiple slow I/Os within a past time period is considered to be stalled. In this example test, an I/O is considered to be slow if its measured I/O response time is longer than a second time threshold $T_2$, which may be different from the first time threshold $T_1$. For example, in embodiments using both diagnostic test 1 and diagnostic test 2, the second time threshold $T_2$ should be shorter than the first time threshold $T_1$, otherwise a single slow I/O request will cause diagnostic test 1 to fail before diagnostic test 2 (requiring multiple slow I/Os) is ever evaluated.

In some embodiments, if a number of slow I/Os is above a number threshold, then the device fails diagnostic test 2. In other embodiments, if a frequency of slow I/Os (for example, number per unit time interval) is above a frequency threshold, then the device fails diagnostic test 2. The number and/or the frequency may be determined by a weighted average over past slow I/Os. The weighting may be a decaying function of the elapsed time since the slow I/O occurred so that recently occurring slow I/Os are weighted more heavily than slow I/Os in the distant past. The elapsed time decay may be a linear decay, an exponential decay, a geometric decay, or some other suitable time decay. The elapsed time decay may represent a time window, in which events occurring outside the time window are given low (or no) weight. The elapsed time delay may include a combination of the above example time delays as well as others. Many variations are possible. An elapsed time decay is not used in some embodiments (for example, distant events are weighted the same as more recent events).

As an example of an embodiment of diagnostic test 2, the system 100 accumulates a weighted number of slow I/Os that occur in the last total number of I/Os. If the weighted number of slow I/Os equals or exceeds a number threshold, then the device fails the example diagnostic test. In some embodiments, the I/Os accumulated for the example diagnostic test include read requests and not write requests. In some such embodiments, read requests that return certain access errors are not included in the test (for example, if the read is to a "bad" sector on an ECC list). In one embodiment, a device fails the example diagnostic test if the weighted number of slow I/Os is greater than or equal to 200 of the last 2000 I/Os.

In certain embodiments, a weighted average may be used to determine, for example, the weighted number of slow I/Os, a weighted I/O response time, and so forth. In certain such embodiments, the weighting may represent a time decay. For example, in some embodiments, the decay comprises multiplying the value of a quantity (denoted by x) by a decay factor for every subsequent sample (denoted by an index n). The value x measured at sample n is represented as $x_n$. In some embodiments, the value at the next sample decays to $x_n \cdot (D-1)/D$, where D is a decay coefficient greater than one. At the following sample, the value decays to $x_n \cdot [(D-1)/D]^2$. For each subsequent sample, the value is multiplied by an additional factor of $[(D-1)/D]$. Thus, the value at the j-th subsequent sample will be equal to $x_n \cdot [(D-1)/D]^j$. In this example embodiment, the value $x_n$ decays according to a geometric progression. This decay is also equivalent to an exponential decay with an exponential decay coefficient equal to $\ln[D/(D-1)]$, where ln represents the natural logarithm. For this example decay embodiment, a value will decay to one-half its original value in a "half-life" given by $\ln(2)/[\ln(D)-\ln(D-1)]$. For example, in some embodiments, the decay coefficient D=2000, and the half-life is 1386 samples. A relatively small value for the decay coefficient D results in a more rapid decay than a relatively larger decay coefficient. In some embodiments, the decay coefficient D may be non-constant and may depend on one or more factors including, for example, the value x, the sample n, a clock time, and so forth. In some embodiments, the decay coefficient D may be dynamically adjusted based on current values of system operating parameters (for example, kernel load, device load, and so forth).

As described above, in some embodiments, the diagnostic test 2 may use a weighted sum (and/or average) of various values. In some of these embodiments, a weighted sum $S_N$ of the last N values may be calculated as $$S_N = \sum_{n=1}^{N} x_n \left(\frac{D-1}{D}\right)^{N-n}.$$

In some embodiments in which a weighted number of slow I/Os is used, the value $x_n$ is equal to 1 if there is a slow I/O at sample n, and the value $x_n$ is equal to 0 if the I/O at sample n is not slow. In some embodiments in which a slow I/O time is accumulated, the variable $x_n$ represents the time at which a slow I/O occurred. As an illustration of an embodiment of diagnostic test 2 in which D=2000 and the number threshold for slow I/Os is 200 out of the last 2000 I/Os, the example diagnostic test 2 will fail if, for example, 211 consecutive slow I/Os occur. If, for example, the slow I/Os do not occur consecutively, then a number of slow I/Os that is larger than 211 would need to occur for the example test to fail.

The choice of the second time threshold $T_2$ may depend on one or more factors, which may be system dependent. For example, the second time threshold $T_2$ may be selected to be longer than timing uncertainties due to clock time resolution. The threshold $T_2$ may be chosen to be longer than the full-stroke seek time of a hard drive (for example, about 20 ms for some hard drives). Smaller values for $T_2$ may cause more false positives due to kernel load delays. The value of $T_2$ may be chosen based on device load. For example, in some embodiments, a smaller value is used for heavily loaded devices (high rate of I/Os), and a lower value is used for lightly loaded devices (low rate of I/Os).

The choice of the number (and/or frequency) threshold and/or the weighting functions used to determine these thresholds may depend on one or more factors, which may be system dependent. For example, a number/frequency threshold that is too low may cause diagnostic test 2 to fail more often than is desirable (for example, based on the processing costs of entering/exiting the stalled state). A number/frequency threshold that is too high may cause diagnostic test 2 to fail too infrequently and may allow a number of problematic I/O events to go undetected.

One possible advantage of diagnostic test 2 is that it may be less sensitive than diagnostic test 1 to timing delays caused by kernel load, because a single slow I/O (caused by kernel delay) will not cause the device to fail diagnostic test 2 (but could cause the device to fail diagnostic test 1). There may be other differences between diagnostic tests 1 and 2 in various embodiments. For example, in one embodiment utilizing both diagnostic test 1 and diagnostic test 2, a single I/O failure or error will cause diagnostic test 1 to fail. Therefore, if a drive fails diagnostic test 2 (but not diagnostic test 1), then each of the multiple I/Os causing test 2 to fail was slow (compared to $T_2$) but successful (otherwise test 1 would have failed). Accordingly, by suitably choosing the time thresholds $T_1$, $T_2$ and the number (or frequency) threshold, the diagnostic tests can be tailored to diagnose different types of device problems.

In certain embodiments, the parameters of diagnostic test 2 (for example, $T_2$, the number/frequency thresholds, the weighting functions, and so forth) may be dynamically adjusted based on current values of system operating parameters (for example, kernel load, device load, and so forth).

c. Example Diagnostic Test 3: Busy+Slow

In this example diagnostic test, a storage device that has been continuously busy for a third time threshold $T_3$ but has not completed a suitable number of I/Os during the time $T_3$ is considered to be stalled. A storage device is considered to be busy if there is at least one access request to the drive that has initiated but not yet completed. Diagnostic test 3 tends to aggregate the performance of multiple I/Os, allowing the device to have a higher level of performance at the expense of latency. The third time threshold $T_3$ may be different from $T_1$ and/or $T_2$. In some embodiments, the third time threshold $T_3$ is much longer than $T_1$ and $T_2$. For example, $T_3$ is about 30 seconds in one embodiment. In such embodiments, diagnostic test 3 tends to gauge trends in device I/O better than diagnostic test 1 or 2.

An advantage of this example is that diagnostic test 3 requires the device to be continuously busy, which reduces the likelihood that round-off errors will dominate time measurements. For example, by measuring a number of I/Os together in a continuous time period ($T_3$), the time resolution (for example, 10 ms in some embodiments) is applied once to a larger time difference.

The choice of the third time threshold $T_3$ may depend on one or more factors, which may be system dependent or independent. For example, the time $T_3$ may be chosen to better represent device I/O performance than the single slow I/O time threshold $T_1$. The time $T_3$ may be chosen to be sufficiently long so that a backlog of write cache data (if present) at the start of the busy time period will not cause the test to fail. The time $T_3$ may be chosen to be significantly longer than the time delay caused by kernel load. In other embodiments, the time threshold $T_3$ may depend on one or a combination of other factors including a time resolution of a timing clock, a retry time for access requests to the device, a seek time for the storage device, an input/output rate of the storage device, a kernel delay, a system load, a load of the storage device, a cache flush time, and so forth.

Diagnostic test 3 is evaluated if a storage device is continuously busy for the time period $T_3$, and test 3 fails if a sufficient number of I/Os in this time period are uncompleted. Therefore, for test 3 to be evaluated, the I/O demand on the drive must be sufficiently high that the device is continuously busy for the time $T_3$. Accordingly, larger values of $T_3$ are suitable for drives expected to have a high I/O demand. For example, if the value of $T_3$ is large and the I/O demand is low, the device will never be continuously busy for diagnostic test 3 ever to come into play. In certain embodiments, the number of uncompleted I/Os and the third threshold $T_3$ are based, at least in part, on access patterns of the devices in the system 100.

In certain embodiments, the parameters of diagnostic test 3 (for example, $T_3$ and/or the number of completed I/Os) may be dynamically adjusted based on current values of system operating parameters (for example, I/O demand).

d. Example Diagnostic Test 4: Timeout Model

In this example, a fourth time threshold is determined according to a dynamically adjustable set of I/O times and expectations for outstanding I/O requests. The fourth time threshold $T_4$ may be dynamically adjusted as I/Os complete.

For example, in one embodiment, the fourth time threshold is determined from:

$$T_4 = \text{expected delays from read activity} + \\ \text{expected delays from write activity} = \\ (\text{max read}) \text{ if there is at least one read outstanding} + \\ (\text{max write}) * (\text{assumed number of outstanding writes})$$

In this example, the expected behavior for outstanding read requests on a device is that the device will not delay sending a response to a completed read and, in the absence of other system activity, will respond to one of the outstanding read requests within a time period denoted by (max read). The time period (max read) may represent a duration in which, for example, there is a high likelihood that a read operation will complete. The time period (max read) may depend on the properties of the device. For example, for embodiments using hard disks operating at 7200 rpm, the time (max read) may be about 20 ms.

In this example, the expected behavior for outstanding write requests to a device is that the device will be able to complete the request in a time period denoted by (max write). The time period (max write) may depend on properties of the device and is about 20 ms in some embodiments. In some embodiments of the system 100, in contrast to reads which are acknowledged promptly, there may be uncertainty over the time when the write is completely written to the storage medium. For example, a caller may be notified of the completion of a write request when the write is cached on the device. Therefore, in this example, the fourth threshold time $T_4$ includes an allowance for an assumed number of pending writes.

In some implementations of this example timeout model, the number of pending writes tends to increase with each write, and one or more heuristics may be used to reduce the expected number of outstanding writes in the time $T_4$. For example, some of these heuristics include: (i) reducing the number to 0 after completion of a cache flush; (ii) limiting the number to be below a threshold, which may be based on known device parameters; (iii) if the device is idle, reduce the number by a factor (idle time−assumed idle delay)/(max write), which may be rounded down so that the remainder is counted against the next request; (iv) if the time for a read completion is greater than (max read), reduce the number by (completion time−(max read))/(max write), which may be rounded up; and (v) if the time for a write completion is greater than (max write), reduce the number by (completion time)/(max write), which may be rounded up.

B. Examples of Transitioning a Device to a Stalled State

In various embodiments, the storage system 100 may provide one or more operational states for storage devices and/or nodes. In certain embodiments, the state management modules 112, 114, 116 of the respective nodes 102, 104, 106 use the current operational states of the storage devices (and/or nodes) to determine how to allocate storage on the system, where to direct access requests, and so forth. For example, in one example embodiment, the operational states include an "UP" state, a "STALLED" state, and a "DOWN" state. During normal operations, the device is in the UP state. If the system 100 determines that the device has stalled (see state 210 in FIG. 2), the system 100 transitions the device to the STALLED state (see state 220 in FIG. 2). The system 100 may then run evaluation tests on the stalled drive (see state 230 in FIG. 2). If the device passes the evaluation tests, the system 100 transitions the device from the STALLED state back to the UP state. If the device fails the evaluation tests, the system 100 transitions the device from the STALLED state to the DOWN state in which, for example, no further access requests are directed to the DOWN device. In some embodiments, the system 100 may restripe data away from the device in the DOWN state. If the DOWN device cannot be repaired, the device may be removed from the system 100 in certain embodiments. In other embodiments of the storage system 100, additional and/or different operational states may be used. An example of another embodiment of operational states in a storage system 100 will now be described.

1. Example State Model

Figure 4:
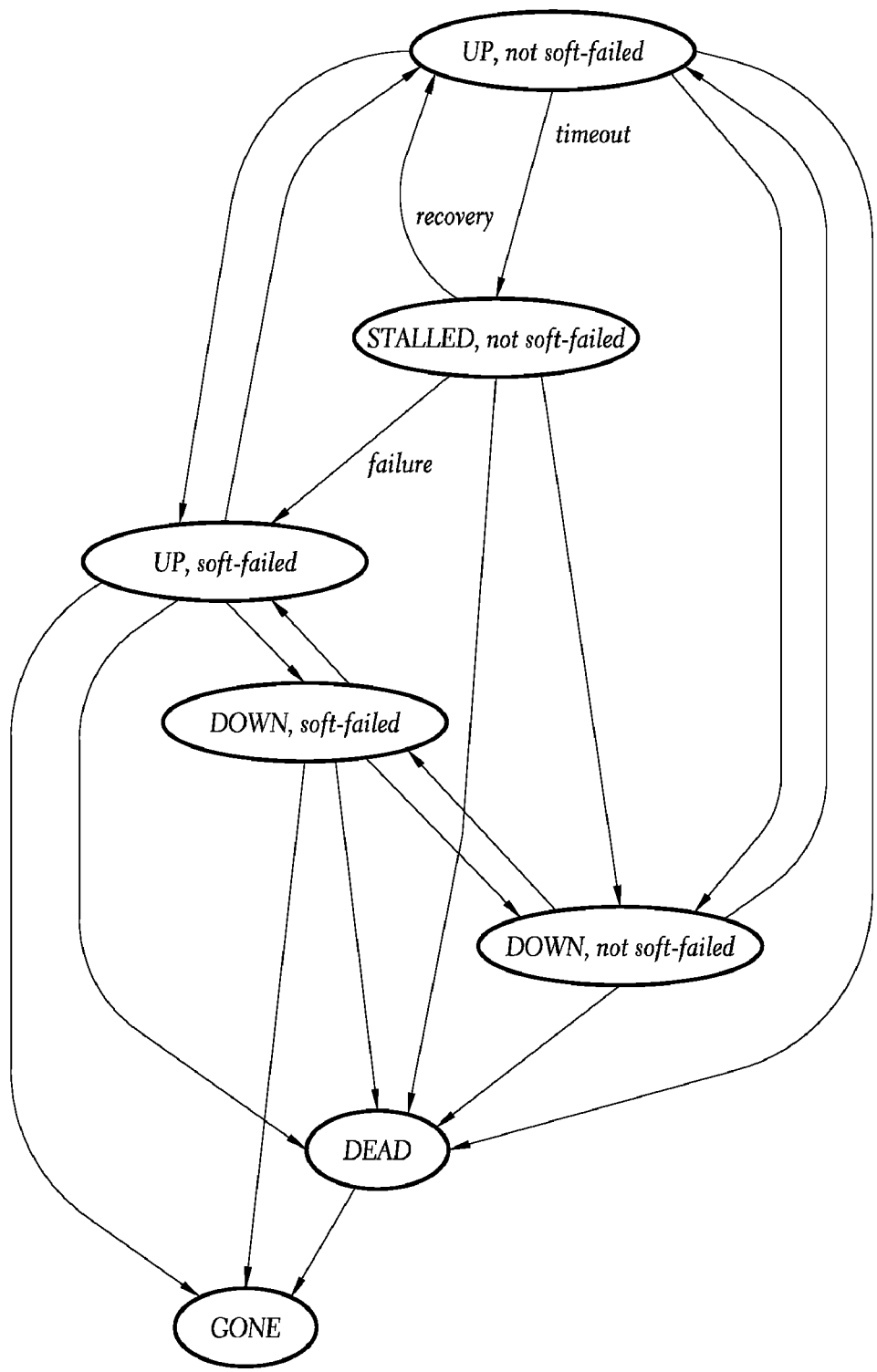
FIG. 4 schematically illustrates an embodiment of a state diagram for a storage device.

FIG. 4 schematically illustrates an embodiment of an example state diagram for operational states in an embodiment of the storage system 100. In some embodiments, the operational states may be defined for storage devices (such as, for example, the storage devices 124, 126, 128 shown in FIG. 1) and/or for storage nodes (such as, for example, the nodes 102, 104, 106 shown in FIG. 1).

In the example shown in FIG. 4, some of the states include a designation "soft-failed" ("SF") or "not soft-failed" ("NSF"). In this example, a device may be soft-failed if an error occurs on the device that is not related to a resource access request to the device (for example, a non-ECC error). In some embodiments, a device may be soft-failed by a user or system manager. One possible advantage of system embodiments using the SF/NSF designation is that the system 100 provide operational states that distinguish between access request problems (for example, ECC errors) and non-access request problems (for example, non-ECC errors). The example states shown in FIG. 4 also reference restriping data from a device. In certain embodiments, restriping takes data (and/or metadata) stored on one device and redistributes the data among other devices (and/or nodes) of the storage system 100. The restriping process may be used, for example, when one of the devices (and/or nodes) experiences some type of failure such that the missing data may be regenerated and then restored on the system 100. The restriping process may also be used when one or more devices (and/or nodes) are added to or removed from the storage system 100 such that data may be added to the new devices/nodes or redistributed to other devices/nodes. Further examples of embodiments of a restriping process are provided in the above-incorporated U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002.

In certain embodiments, the example state diagram shown in FIG. 4 includes the following states for storage devices (and/or nodes) of the example storage system 100 shown in FIG. 1.

a. (UP, NSF): The device is fully available and operating normally.
b. (UP, SF): The device is available with three qualifications: (1) the device is read-only; (2) reads from the device will be avoided if possible; and (3) data stored on the device should automatically be restriped away from the device, if possible.
c. (STALLED, NSF): The device is stalled (for example, by failing one or more of the diagnostic tests described above).
d. (DOWN, NSF): The device is not available. Data may be restriped away from the device, but automatic restriping is not initiated.
e. (DOWN, SF): The device is not available. Automatic restriping is initiated.
f. (DEAD): The device has been permanently removed from the storage system. References to the device remain on the system. Automatic restriping is initiated.
g. (GONE): The device has been permanently removed from the storage system and all references to the device have been removed from the system by the restripe process.

In this embodiment of a state model for devices, a (STALLED, SF) state is not provided. Therefore, the (STALLED, NSF) state will be referred to simply as the (STALLED) state. Other embodiments may provide a (STALLED, SF) state.

The example state diagram shown in FIG. 4 provides various transitions among the operational states. In the following, the transitions will be described with reference to devices in the storage system 100. As noted above, in other embodiments, the operational states and transitions shown in FIG. 4 may apply to devices, nodes, or both.

Examples of some of the transitions not involving the (STALLED) state will now be described for an embodiment of the storage system 100. When a device is added to the system 100, the drive is brought into service in the (UP, NSF) state. A device transitions from UP to DOWN (without change of its NSF or SF designation) when the device is unmounted or when the system 100 fails to detect the device. The device may transition from the UP state to the (DOWN, SF) state when a non-ECC I/O error occurs. For example, in some embodiments, the device may make the transition from the UP state to the (DOWN, SF) state when a non-ECC read error occurs or when a write error occurs (one or both of which may indicate that the device has been disconnected from its controller). A device may transition from DOWN to UP when the device is mounted or when the system 100 re-detects the device after a detection failure. A user may request a device transition between the (DOWN, NSF) state and the (DOWN, SF) state. A (DOWN, NSF) device prevents automatic initiation of restriping. Devices in the (DOWN, SF) state initiate restriping (in the absence of (DOWN, NSF) devices). If a device transitions to the (UP, SF) state, restriping is automatically initiated unless there are (DOWN, NSF) devices in the system 100. A device in the UP or DOWN state transitions to the (DEAD) state when it is to be removed from the system 100 (for example, by user intervention). A device in the (DEAD), (UP, SF), or (DOWN, SF) state transitions to the (GONE) state after the restriping process removes all references to the device from the system 100. Additional and/or different transitions may be allowed in other embodiments of the system 100.

Certain embodiments of the storage system 100 include the (STALLED) state shown in FIG. 4 for devices (and/or nodes) that have stalled. Examples of transitions involving the (STALLED) state will be described for an embodiment of the storage system 100. A device in the (UP, NSF) state may transition to the (STALLED) state if the device fails one or more of the diagnostic tests described above (for example, the device is responding slowly). In the example state diagram shown in FIG. 4, this transition is marked "timeout" to indicate that, in some embodiments, the transition is performed if an access request "times out." In some embodiments, a user may request a device transition to the (STALLED) state for testing/debugging purposes. A device in the (STALLED) state may transition to the (UP, NSF) state if evaluation of the device indicates that the device is again responding normally. In FIG. 4, this transition is marked "recovery" to indicate that, in some embodiments, the device has recovered or been repaired. In some embodiments, this transition may be made by user request as part of device testing/debugging. A device in the (STALLED) state may transition to the (UP, SF) state if, for example, the device remains in the (STALLED) state for too long and/or if the device has been in the (STALLED) state too many times during a past time period. In some embodiments, the device can transition from the (STALLED) state to the (UP, SF) state for any of the reasons that a device transitions from the (UP, NSF) state to the (UP, SF) state. In the example shown in FIG. 4, this transition is marked "failure" to indicate that recovery and/or repair attempts (for example, sector repair) have failed to return the device to a normal operative state. A device may transition from the (STALLED) state to the (DOWN, NSF) state through, for example, user intervention to suspend a stalled drive. A device may transition from the (STALLED) state to the (DEAD) state if the device is to be removed from the system 100.

2. Example Methods for Transitioning a Device to the (STALLED) State

Figure 5:
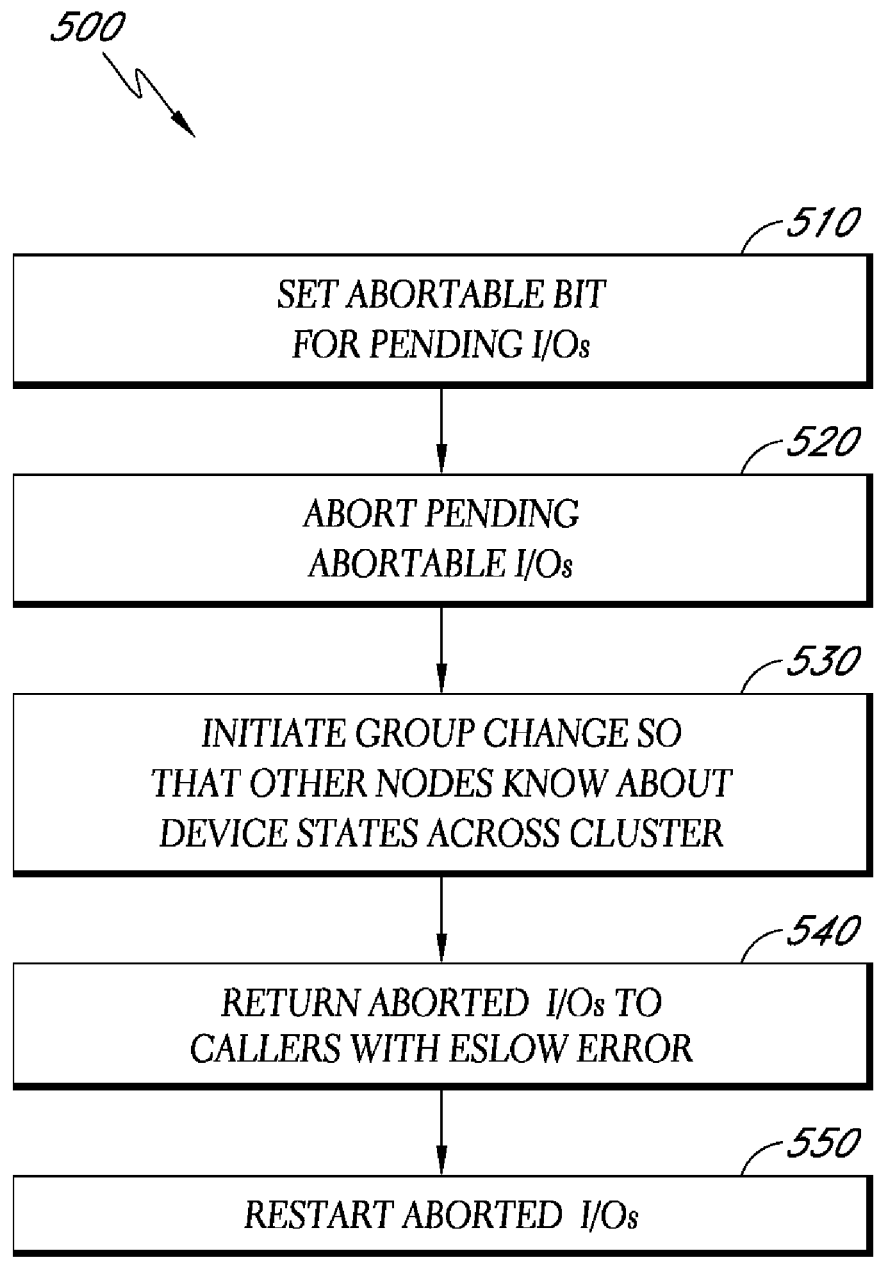
FIG. 5 is a flow chart that schematically illustrates an embodiment of a method for transitioning a device to a stalled state.

FIG. 5 is a flow chart that schematically illustrates an embodiment of a method 500 for transitioning a device to a (STALLED) state in an embodiment of a storage system. The example method 500 will be described in the context of data I/O requests to an embodiment of the storage system 100 shown in FIG. 1. In the following illustrative example, the state management module 112 of the node A 102 has determined that the drive 130 is stalled, for example, because the drive 130 has failed one or more of the diagnostic tests described above.

In certain embodiments, the storage system 100 stores and/or implements an embodiment of the following example procedure to abort and then restart pending I/O requests to the device transitioning to the (STALLED) state. In this example embodiment, the storage system's I/O request structure (which may be generally similar to the UNIX bio structure for block I/O operations) includes an "abortable" bit, which is unset (for example, 0) by default. When the abortable bit is unset in an I/O request to a device in the (STALLED) state, the state management module will not abort the I/O request and will send the request to the associated device driver. However, when the abortable bit is set (for example, 1) on an I/O request to a device in the (STALLED) state, the state management module will return the request to the calling thread with an ESLOW error rather than directing the request to the device driver. In some embodiments, the system's I/O request structure provides the abortable bit for read requests but not for write requests, because write requests to stalled devices may not slow the system as much as read requests to stalled devices. A possible advantage of providing an I/O request structure with the abortable bit is that I/O requests to a (STALLED) device can be aborted and redirected to non-(STALLED) devices.

In the embodiment of the method 500 shown in FIG. 5, in state 510 the abortable bit is set for pending I/O requests to the stalled device, and in state 520, the pending abortable I/O requests are aborted. Aborted I/O requests are retuned to their calling threads with an ESLOW error code. For example, if node B 104 sends a request to node A 102 for data stored on the stalled drive 130, the state management module 112 of node A 102 returns the request to node B 104 (with an ESLOW error) rather than sending the I/O request to the driver 118, which handles the low-level access to the hard disk drive 130. In some embodiments, I/O requests in a request queue in a driver are aborted, and I/O requests that have been sent to the device controller are not aborted.

Each of the state management modules 112, 114, and 116 has a data structure that includes information on the current operational state of the nodes and/or devices of the system 100. In state 530, the system 100 initiates a group change in which the current operational state for the nodes and devices of the system 100 is updated. For example, in the system embodiment of FIG. 1, the state management module 112 may broadcast messages to the nodes 104 and 106 to notify these nodes that the drive 130 is going to enter the (STALLED) state. The state management modules 114 and 116 update their respective data structures to reflect that the drive 130 is in the (STALLED) state. Before the group change is complete, it is possible that abortable I/O requests may continue to be issued to the stalled drive 130. However, in state 540, the state management module 112 will return such access requests with an ESLOW error code to the calling threads.

When the group change is complete, all the nodes of the storage system 100 have information on the current operational states (for example, (UP, NSF), (STALLED), (DOWN, NSF), and so forth) of the nodes/devices in the system 100. In state 550, aborted I/O requests are restarted as will be further described below, and the system 100 can direct data access requests to currently available devices (for example, devices in the (UP, NSF) state) rather than to devices in the (STALLED) state. Accordingly, embodiments of the storage system 100 that implement an embodiment of the system and methods disclosed herein advantageously can reduce the likelihood that future access requests will be made to slow and/or erratic drives, which may reduce the likelihood of a global slowdown of the system 100.

In certain embodiments, in addition (or as an alternative) to the methods described herein, the storage system 100 may store and/or implement various methods for managing devices that are unavailable for I/O. For example, in some implementations, a device may be unavailable because the device has been transitioned to a (DOWN) state or a (STALLED) state, and/or because of an accidental disconnection, an irregularity in a power supply, an abnormal temperature, an excessive duty cycle, aberrant behavior, and so forth. Therefore, certain such embodiments of the storage system 100 may store and/or implement embodiments of one or more methods described in, for example, U.S. patent application Ser. No. 11/643,725, filed Dec. 21, 2006, entitled "SYSTEMS AND METHODS FOR MANAGING UNAVAILABLE STORAGE DEVICES," which is hereby incorporated by reference herein in its entirety.

C. Examples of Evaluating a (STALLED) Device

As described above, in certain embodiments of the method 200 shown in FIG. 2, in state 230, the system 100 evaluates whether a device in the (STALLED) state should remain in the (STALLED) state or be transitioned to another state such as, for example, the states described with reference to FIG. 4.

In the following illustrative example, the hard disk drive 130 of node A 102 of the embodiment of the storage system 100 has been transitioned to the (STALLED) state. To evaluate the STALLED drive 130, in this example the state management module 112 forks off a background evaluation process to test the drive 130. In various embodiments, the evaluation process may send various types of I/O requests to the driver 118 for data on the drive 130. The evaluation process may repeat one or more evaluation tests on the drive 130. In some embodiments, each repeated test is delayed to reduce consumption of system CPU. If the drive 130 passes one (or more) of the evaluation tests, the system 100 considers the drive 130 "recovered," and the state management module 112 transitions the drive 130 back to the (UP, NSF) state. In certain embodiments, garbage collection may be initiated to collect any blocks that were orphaned while the drive 130 was in the (STALLED) state.

In some system embodiments, if the drive 130 repeatedly fails the evaluation tests, the state management module 112 soft-fails the drive 130 and transitions it to the (UP, SF) state. In other embodiments, the state management module 112 transitions the drive 130 to the (UP, SF) state if the drive 130 remains in the (STALLED) state for more than a threshold time period. When a device is soft-failed and in the (UP, SF) state, the system 100 may utilize other types of diagnostic tests to determine the severity of problems with the device.

In various embodiments of the system 100, a variety of evaluation tests may be used to determine if a stalled device has recovered and should be returned to the (UP, NSF) state. For example, evaluation tests may include testing and/or repair of the stalled device. In certain embodiments where the stalled device is a hard disk drive, the evaluation tests may perform some of the following actions.

a. The evaluation test may initiate a number of reads from a set of sectors across the entire disk. This has benefits of sampling the entire drive and testing the drive's ability to seek. In some embodiments, if the test is repeated, a different set of sectors is chosen for the read so that one (or more) slow sectors do not skew the test results.
 b. The evaluation test may initiate a number of reads for disk sectors that are near the disk sector responsible for the slow response, because is not uncommon for a disk problem (for example, a read/write head crash) to affect a group of nearby sectors. This evaluation test may provide benefits such as detecting bad sectors that otherwise might not be identified in the course of normal client activity. In some embodiments, the bad sectors are repaired or, if not repairable, marked for non-use. Further, by identifying bad sectors earlier (rather than waiting for client access to the sectors), data in these sectors can be reallocated to other sectors (and/or other devices/nodes). In some embodiments, the system 100 may track reallocation counts and advantageously identify failing drives by their high reallocation counts.
 c. The evaluation tests may increase in scope for drives that have entered the (STALLED) state repeatedly. For example, drives that STALL once (or very infrequently) may initially undergo light testing so that a (possibly) minor drive malfunction does not cause a significant impact on system performance. Drives that stall more frequently may be tested more extensively and/or, in some embodiments, be soft-failed.
 d. The evaluation test may initiate writes across the disk. In some embodiments, unused, reserved disk blocks are used for the writes.

III. Example I/O Restart Systems and Methods

As described above, in transitioning a device to a (STALLED) state, embodiments of the storage system 100 may perform a group change operation so that nodes and/or devices in the storage system 100 have knowledge of the current operational state of the other nodes and/or devices in the system 100. Certain embodiments of the system 100 implement procedures to preferentially direct I/O requests to normally-operating devices (for example, devices in the (UP, NSF) state) rather than to slow or soft-failed devices (for example, devices in the (STALLED) and/or (UP, SF) states). However, in some cases, the requested data may not be obtainable by accessing just the normally-operating devices.

For example, if a client requests data that is stored on a stalled and/or soft-failed device, the normally-operating devices may not have a complete mirrored copy of the data and/or may not have sufficient parity data to reconstruct the requested data. In such cases, rather than returning an error to the client, certain embodiments may permit limited access to stalled and/or soft-failed devices to obtain enough data to fulfill the client's request.

Accordingly, certain such embodiments may implement a multi-step I/O restart mechanism. For example, on a first I/O attempt, the I/O request is directed to normally-operating devices but not stalled or soft-failed devices. If the first I/O attempt fails, a second I/O attempt is directed to normally-operating devices and stalled devices. If the second I/O attempt fails, a third I/O attempt is directed to normally-operating devices, stalled devices, and soft-failed devices. In some embodiments, if the failure of the first I/O attempt was not due to the inability to obtain the data from a stalled device, the second I/O attempt is skipped, and the restart mechanism goes directly to the third I/O attempt (because the requested data is likely on a soft-failed, rather than a stalled, device).

A. Examples of Multi-Step Restart Systems and Methods

Certain embodiments of the storage system 100 store and/or implement the multi-step I/O restart mechanism by defining (i) operational states, (ii) capabilities, and (iii) access levels for devices and/or nodes of the system 100. Operational states have been described above with reference to the example shown in FIG. 4. In the following illustrative example, storage devices and nodes may be in any of the operational states shown in FIG. 4, with the exception that the (STALLED) state is not defined for nodes. In other embodiments, a (STALLED) state may be used for nodes.

Capabilities for a device and/or node include the I/O operations that can be performed on the device and/or node. In the following illustrative example, the capabilities include whether the device/node is readable (READ) or writeable (WRITE). In other embodiments, the capabilities may include whether new blocks may be allocated to and/or freed from the device/node, whether data should be restriped away from the device/node, and so forth. Capabilities may be defined for any type of I/O operation used by the system 100.

Access levels for a device and/or node are defined to reflect a minimum access level an I/O request thread must have for a particular capability of the device/node. For example, in some embodiments if the access level of an I/O request thread exceeds the minimum access level for the device/node, then the I/O thread is permitted to have access to the device/node. In such a case, the device/node is "accessible" to the I/O request thread. If the access level of the I/O request thread is below the minimum access level for the device/node, then the device/node is "inaccessible," and the I/O request fails. In the following illustrative example, the following access levels are used.

a. NORMAL: the normal operational access level for devices and/or nodes.
 b. READ_STALLED: In addition to NORMAL devices/nodes, devices in the (STALLED) state are also readable.
 c. MODIFY_STALLED: In addition to READ_STALLED device/nodes, devices in the (STALLED) state are readable and writable. This access level is provided so that writes can succeed even if all the devices in the storage system are stalled.
 d. READ_SOFTFAIL: In addition to MODIFY_STALLED devices/nodes, soft-failed devices and/or nodes are readable.
 e. NEVER: No I/O requests are permitted to the device/node.

In some embodiments, an enumeration is used to represent the access levels. For example, NORMAL=0, READ_STALLED=10, MODIFY_STALLED=20, READ_SOFTAIL=30, and NEVER=(hex) infinity. A similar enumeration may be used for the access levels of I/O request threads. In some embodiments, a simple comparison of the I/O thread's access level and the device/node's access level determines whether the device/node is available for the I/O operation of the I/O request thread.

In certain embodiments, device and/or node operational states and capabilities are reevaluated whenever there is a group change. For example, the state management modules 112, 114, 116 for each of the nodes 102, 104, 106 in the example system 100 may use a data structure (for example, an array) to store information for the states and capabilities of each of the nodes/devices of the system 100. Accordingly, such embodiments of the system 100 can readily determine the following types of information: (i) determine the capability of a (node, device) pair; (ii) determine a list of all nodes that have a given capability; and/or (iii) determine a list of all devices in a given node that have a given capability. Also, in some embodiments, the access level of a node supersedes the access level of a device on that node. For example, if a node is out of service for repair, the system 100 may assign the node an access level of NEVER. An I/O request to that node will always fail, even if some or all of the individual devices of the node have access levels of NORMAL. Each (capability, access level) pair maps to a certain set of device states and node states. Table 1 is an example of this mapping for this illustrative embodiment using the operational states shown in FIG. 4.

TABLE 1

| (Capability, Access Level) | Device State(s) | Node State(s) |
|---|---|---|
| (READ, NORMAL) | (UP, NSF) | (UP, NSF) |
| (READ, READ_STALLED) | (UP, NSF), (STALLED) | (UP, NSF) |
| (READ, MODIFY_STALLED) | (UP, NSF), (STALLED) | (UP, NSF) |
| (READ, READ_SOFTFAIL) | (UP, NSF), (UP, SF), (STALLED) | (UP, NSF), (UP, SF) |
| (WRITE, NORMAL) | (UP, NSF) | (UP, NSF) |
| (WRITE, READ_STALLED) | (UP, NSF) | (UP, NSF) |
| (WRITE, MODIFY_STALLED) | (UP, NSF), (STALLED) | (UP, NSF) |
| (WRITE, READ_SOFTFAIL) | (UP, NSF), (STALLED) | (UP, NSF) |

Each node state and drive state has a minimum access level for each capability. Tables 2 and 3 show the minimum access levels for reads and writes for nodes and drives, respectively, for this example embodiment. As can be seen from Tables 1-3, in this example embodiment, writes are not permitted on soft-failed devices or soft-failed nodes.

TABLE 2

| Node States | Minimum Access Level to Read | Minimum Access Level to Write |
|---|---|---|
| (UP, NSF) | NORMAL | NORMAL |
| (UP, SF) | READ_SOFTFAIL | NEVER |
| (DOWN, NSF) | NEVER | NEVER |
| (DOWN, SF) | NEVER | NEVER |
| (DEAD) | NEVER | NEVER |
| (GONE) | NEVER | NEVER |

TABLE 3

| Device States | Minimum Access Level to Read | Minimum Access Level to Write |
|---|---|---|
| (UP, NSF) | NORMAL | NORMAL |
| (UP, SF) | READ_SOFTFAIL | NEVER |
| (STALLED) | READ_STALLED | MODIFY_STALLED |
| (DOWN, NSF) | NEVER | NEVER |
| (DOWN, SF) | NEVER | NEVER |
| (DEAD) | NEVER | NEVER |
| (GONE) | NEVER | NEVER |

Figure 6:
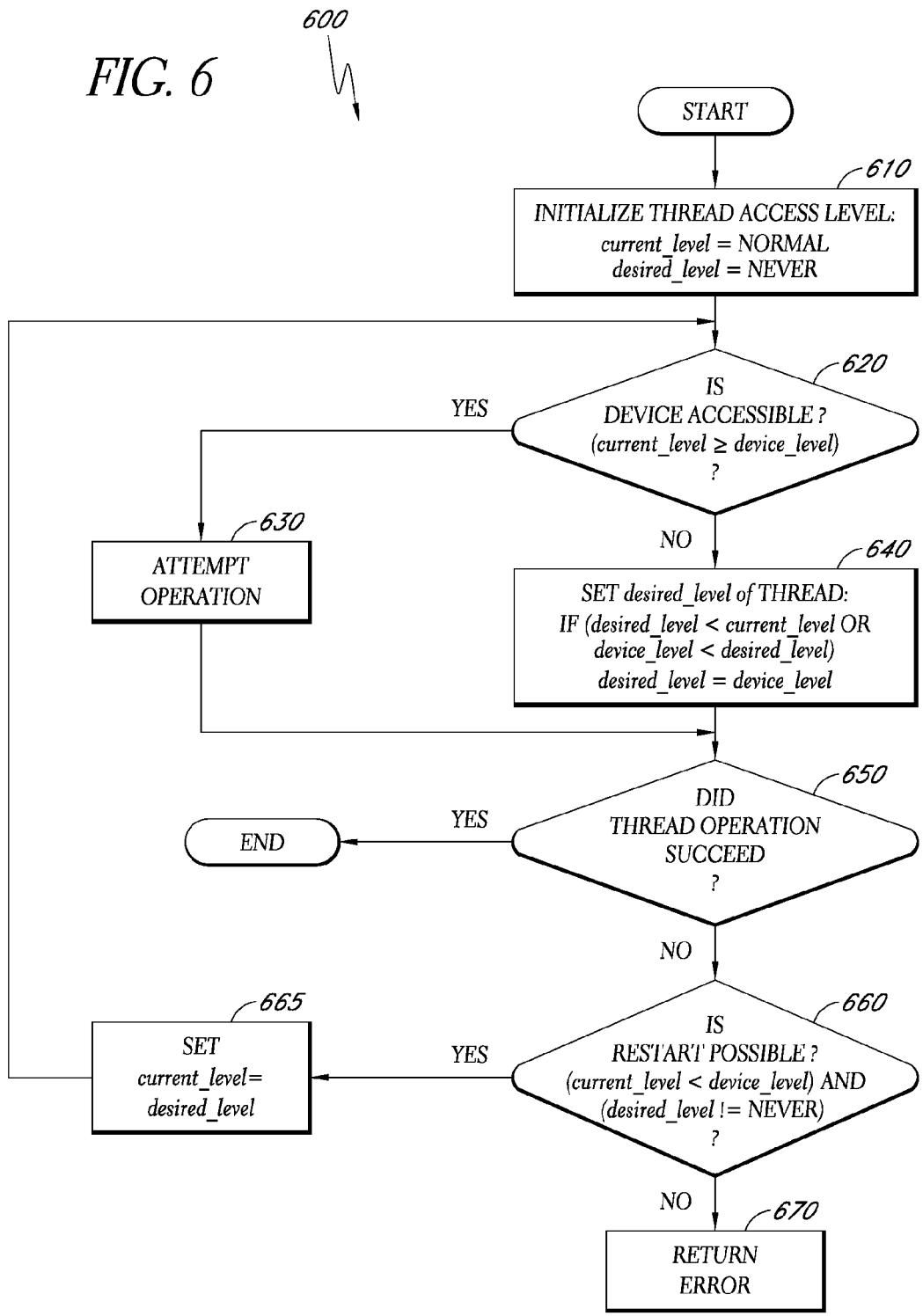
FIG. 6 is a flow chart that schematically illustrates an embodiment of a method for thread I/O access requests to a storage medium.

FIG. 6 is a flow chart that schematically illustrates an embodiment of a method 600 for thread I/O access requests to a storage medium. Embodiments of the storage system 100 shown in FIG. 1 may be configured to store and/or implement embodiments of the method 600. In various embodiments, the storage medium may be a storage device (such as, for example, the storage devices 124, 126, 128 of FIG. 1) and/or a storage node (such as, for example the nodes 102, 104, 106 of FIG. 1). The thread request may be an operation related to any capability of the device such as, for example, a read operation or a write operation.

As described above, for any capability, a device has a minimum access level for that capability (see, for example, Table 2 for nodes and Table 3 for devices). In the example method 600, the minimum access level for the storage medium is associated with the variable: device_level. The I/O request thread is associated with two access level variables: current_level and desired_level. The variables device_level, current_level, and desired_level are used to store one of the access levels: NORMAL, READ_STALLED, MODIFY_STALLED, READ_SOFTFAIL, or NEVER.

In the example embodiment of the method 600 shown in FIG. 6, in state 610, the system 100 initializes the current_level to be NORMAL and the desired_level to be NEVER. The example method 600 continues in state 620 to determine whether the device is accessible to the thread. In this embodiment, the device is accessible if the thread's current_level is greater than or equal to the device's device-level. If the device is accessible, the method 600 continues in state 630 and the thread's I/O request is attempted by the device. If the device is not accessible to the thread, the method 600 continues in state 640 in which the desired_level of the thread is set. In this example, if the thread's desired_level is less than the thread's current_level or the device's device_level is less than the thread's desired_level, then the thread's desired_level is set to the device's device_level.

In this example, the method 600 continues in state 650 and determines whether the thread's I/O request operation succeeded. For example, if the device was accessible to the thread (state 620), the thread operation was attempted (state 630) and may have succeeded or failed on the device. If the device was inaccessible to the thread (state 620), the thread operation nonetheless could have been successful, because the I/O request was fulfilled by another device of the storage system 100. In state 650, if the thread operation succeeded, the method 600 ends. If the thread operation did not succeed, the method 600 continues in state 660 in which the system 100 determines whether the operation can be restarted. In this embodiment, a restart is possible if the thread's current_level is less than the thread's desired_level and the thread's desired_level is not equal to NEVER. If a restart is possible, the method 600 continues in state 665 in which current_level is set equal to desired_level, and then the method 600 returns to state 620 to determine if the device is accessible. For example, a group change may have occurred and the device's access level may have changed. If a restart is not possible, the method 600 continues in state 670 in which an error is returned to the caller.

IV. Other Embodiments

While certain embodiments of the invention have been described, these embodiments have been presented by way of example only, and are not intended to limit the scope of the present invention. For example, certain illustrative embodiments of the disclosed systems and methods have been described with reference to managing access to stalled devices such as hard disk drives. The disclosed systems and methods are not limited by the illustrative examples. For example, in other embodiments, the disclosed systems and methods may be applied to managing access to stalled nodes on a clustered storage system. Many variations are contemplated.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, country, and so forth.

What is claimed is:

1. A method of managing access requests by a thread for a resource stored on a storage device, the method comprising:
   initializing a thread access level for an access request by a thread for a resource stored on a storage device, the storage device having a device access level;
   determining whether the storage device is accessible based at least in part on the thread access level and the device access level; and
   selecting a thread operation based at least in part on the determination of whether the storage device is accessible, the thread operation selected from attempting the thread access request if the device is accessible and determining whether to restart the thread access request if the device is not accessible.

2. The method of managing access requests of claim 1, wherein initializing the thread access level comprises initializing a current thread access level and a desired thread access level.

3. The method of managing access requests of claim 2, wherein determining whether the storage device is accessible comprises comparing the current thread access level and the device access level.

4. The method of managing access requests of claim 3, wherein if the storage device is determined not to be accessible, the method further comprises updating the desired thread access level based at least in part on the desired thread access level, the current thread access level, and the device access level.

5. The method of managing access requests of claim 1, wherein if the thread operation is selected to be attempting the thread access request, the method further comprises determining whether the thread access request was successful.

6. The method of managing access requests of claim 5, wherein if the thread access request is not determined to be successful, the method further comprises determining whether to restart the thread access request.

7. The method of managing access requests of claim 1, wherein determining whether to restart the thread access request is based at least in part on the thread access level and the device access level.

8. A system of managing access requests by a thread for a resource stored on a storage device, the system comprising:
   a storage device for storing a resource; and
   a software module configured to:
      initialize a thread access level for an access request by a thread for a resource stored on a storage device, the storage device having a device access level;
      determine whether the storage device is accessible based at least in part on the thread access level and the device access level; and
      select a thread operation based at least in part on whether the storage device is determined to be accessible, the thread operation selected from attempting the thread access request if the device is accessible and determining whether to restart the thread access request if the device is not accessible.

9. The system of claim 8, wherein to initialize the thread access level, the software module is further configured to initialize a current thread access level and a desired thread access level.

10. The system of claim 9, wherein to determine whether the storage device is accessible, the software module is further configured to compare the current thread access level and the device access level.

11. The system of claim 10, wherein if the storage device is determined not to be accessible, the software module is further configured to update the desired thread access level based at least in part on the desired thread access level, the current thread access level, and the device access level.

12. The system of claim 8, wherein if the thread operation is selected to be attempting the thread access request, the software is further configured to determine whether the thread access request was successful.

13. The system of claim 12, wherein if the thread access request is not determined to be successful, the software module is further configured to determine whether to restart the thread access request.

14. The system of claim 8, wherein the software module is further configured to determine whether to restart the thread access request based at least in part on the thread access level and the device access level.

15. A computer-readable medium having stored thereon executable instructions that, when executed by a processor, cause the processor to perform a method of managing access requests by a thread for a resource stored on a storage device, the method comprising:
   initializing a thread access level for an access request by a thread for a resource stored on a storage device, the storage device having a device access level;
   determining whether the storage device is accessible based at least in part on the thread access level and the device access level; and
   selecting a thread operation based at least in part on the determination of whether the storage device is accessible, the thread operation selected from attempting the thread access request if the device is accessible and determining whether to restart the thread access request if the device is not accessible.

* * * * *